(No Model.) 5 Sheets—Sheet 1.
E. E. RUNYON.
COTTON CULTIVATING MACHINE.
No. 412,980. Patented Oct. 15, 1889.
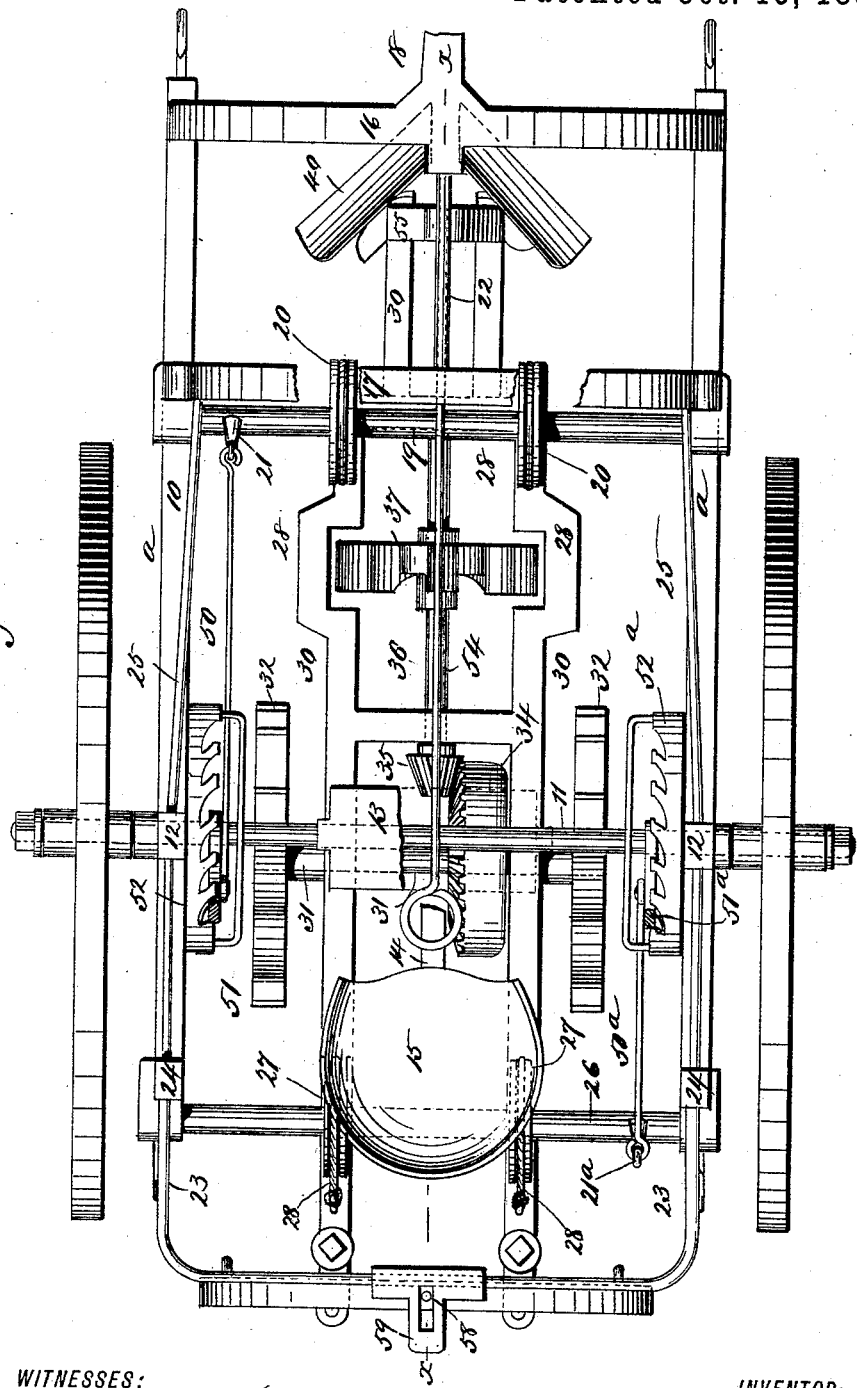
WITNESSES:
Francis McArdle
C. Sedgwick
INVENTOR:
E. E. Runyon
BY
Munn & Co
ATTORNEYS.

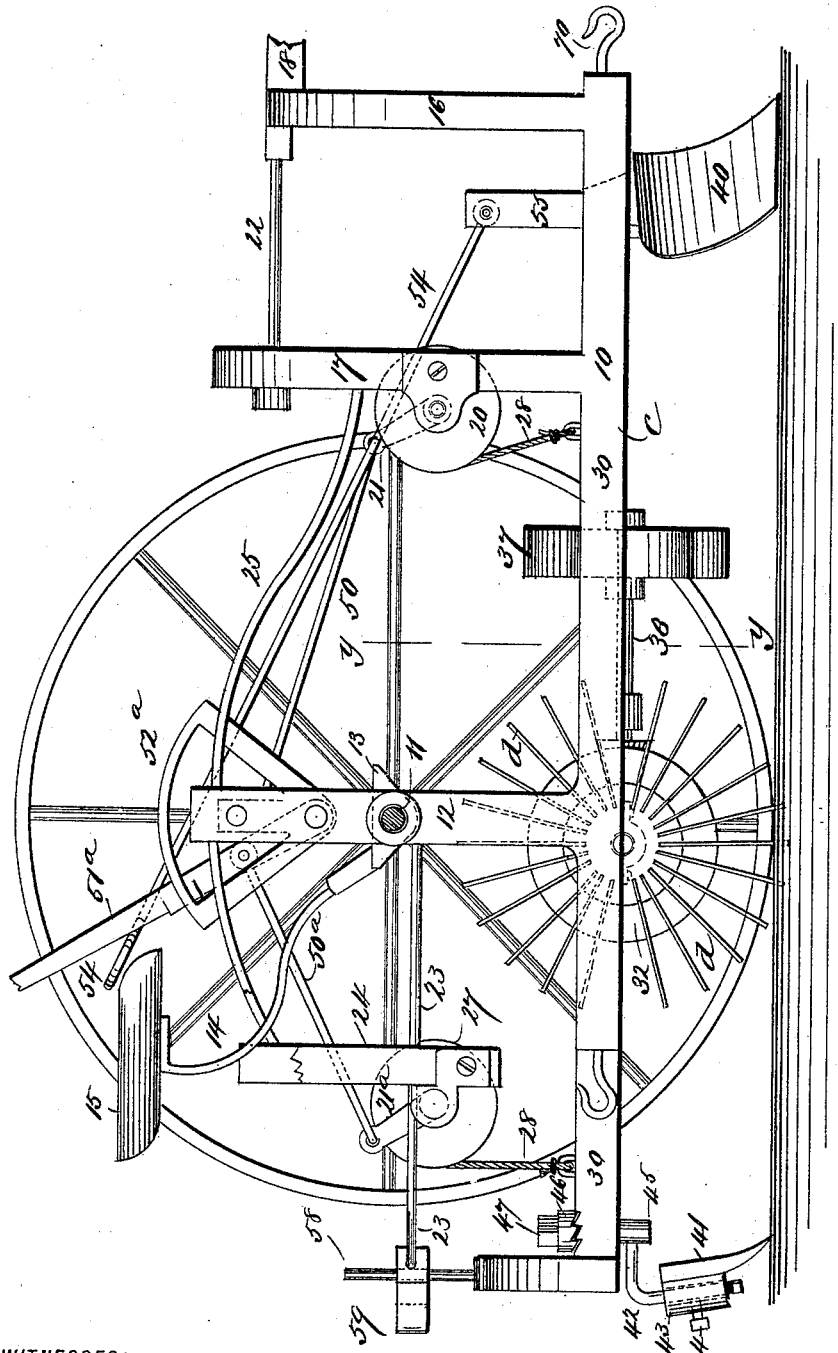

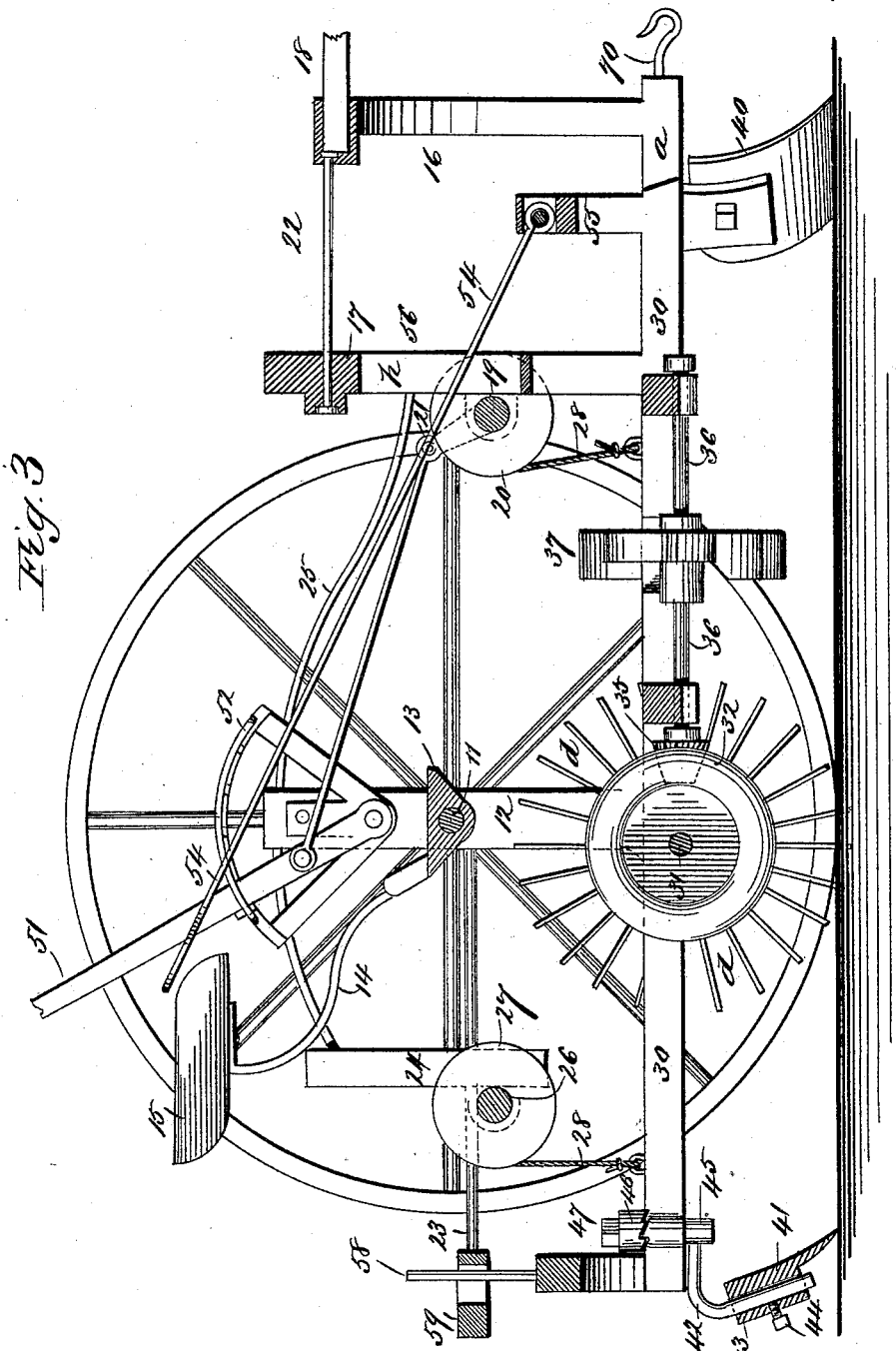

(No Model.) 5 Sheets—Sheet 4.
E. E. RUNYON.
COTTON CULTIVATING MACHINE.
No. 412,980. Patented Oct. 15, 1889.
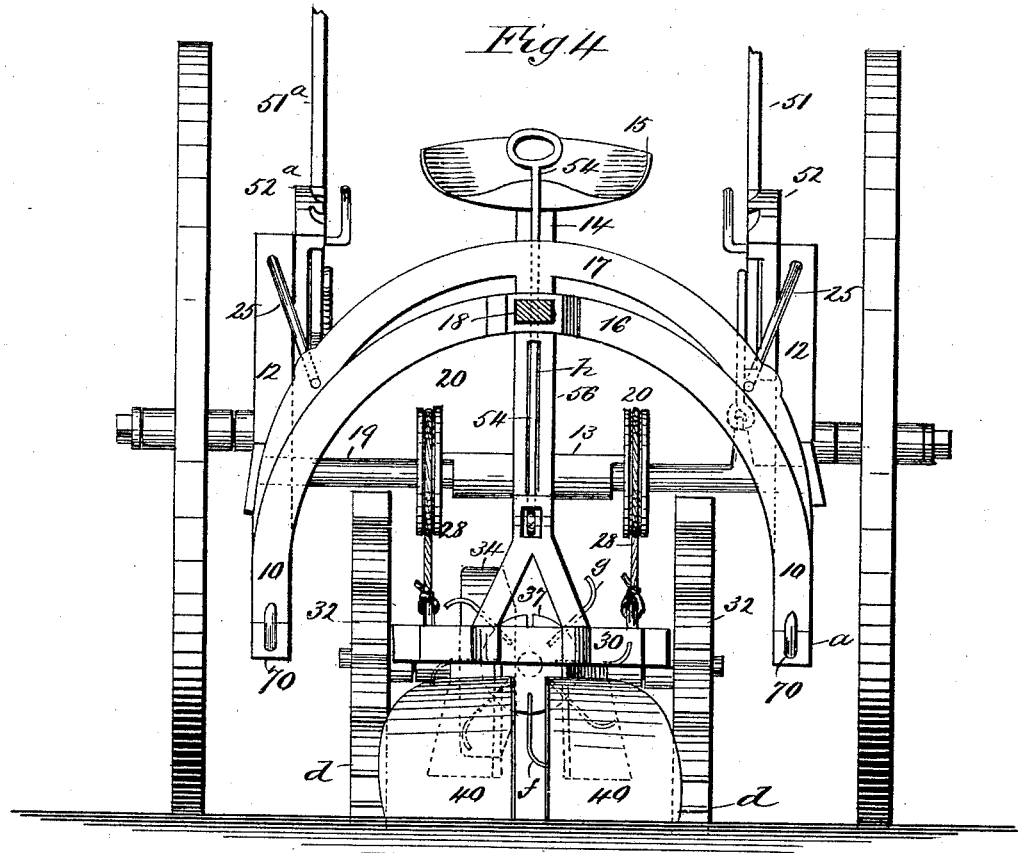
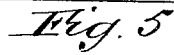
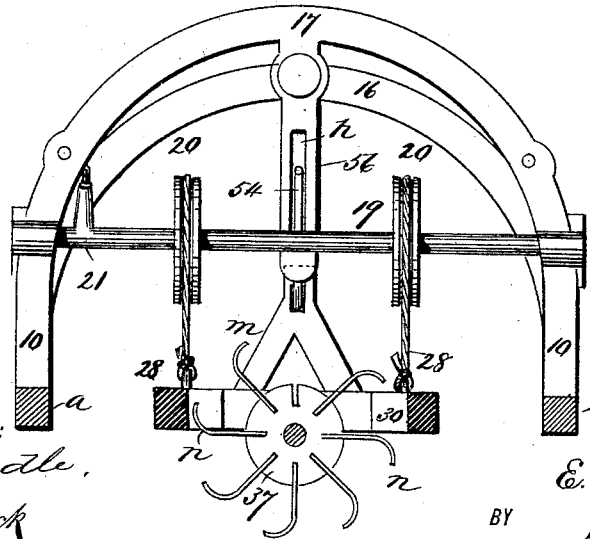
WITNESSES:
F. McArdle
C. Sedgwick
INVENTOR:
E. E. Runyon
BY Munn & Co.
ATTORNEYS.

(No Model.) 5 Sheets—Sheet 5.
E. E. RUNYON.
COTTON CULTIVATING MACHINE.
No. 412,980. Patented Oct. 15, 1889.
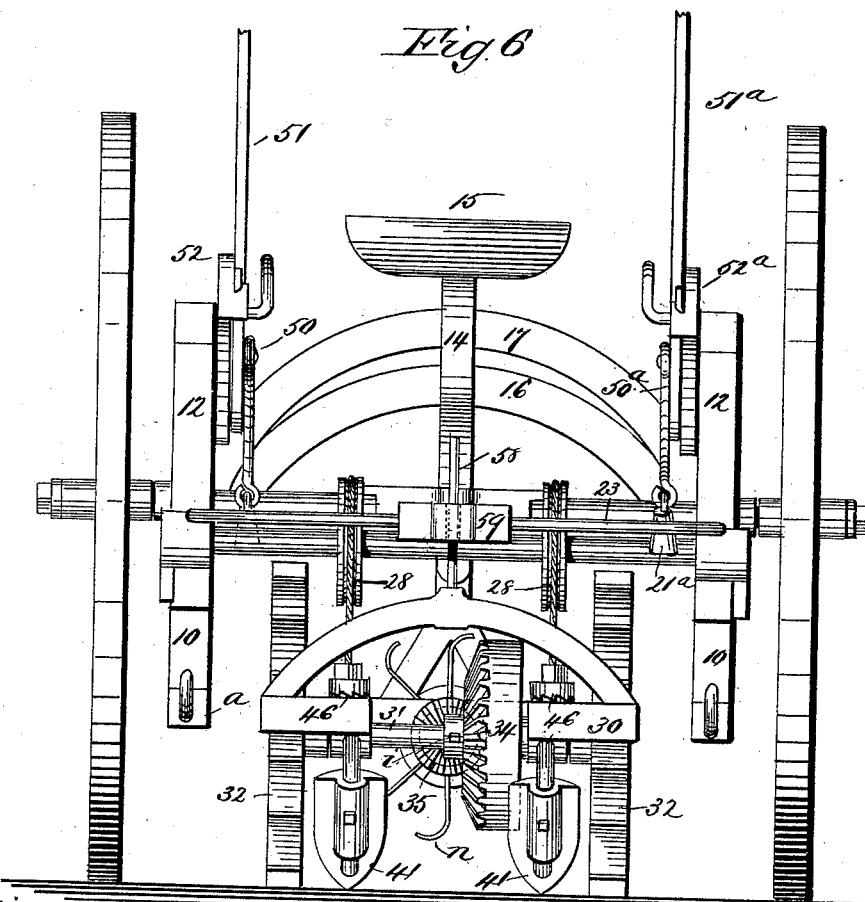
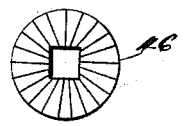
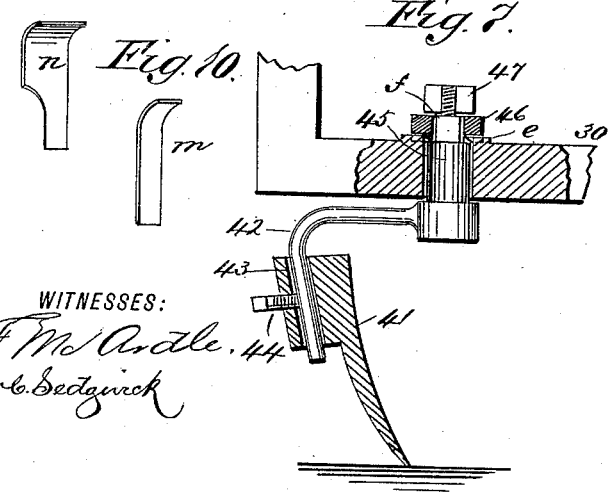
WITNESSES:
F. McArdle
C. Sedgwick
INVENTOR:
E. E. Runyon
BY Munn & Co.
ATTORNEYS.

UNITED STATES PATENT OFFICE.

EDWIN ELIJAH RUNYON, OF BURNS, TEXAS.

COTTON-CULTIVATING MACHINE.

SPECIFICATION forming part of Letters Patent No. 412,980, dated October 15, 1889.

Application filed May 3, 1889. Serial No. 309,507. (No model.)

*To all whom it may concern:*

Be it known that I, EDWIN ELIJAH RUNYON, of Burns, in the county of Cooke and State of Texas, have invented a new and Improved Cotton - Cultivating Machine, of which the following is a full, clear, and exact description.

This invention relates to an implement designed for use in the cultivation of cotton, the object of the invention being to provide an implement which, in passing once over the row of cotton, will chop, scrape, and cultivate said row.

To the ends above named the invention consists, essentially, of a main supporting-frame, a frame adjustably mounted thereon and provided with scraping-shovels, a chopping-wheel, driving-wheels, and adjustable covering-shovels, all as will be hereinafter fully explained, and specifically pointed out in the claims.

Reference is to be had to the accompanying drawings, forming a part of this specification, in which similar figures and letters of reference indicate corresponding parts in all the views.

Figure 1 is a plan view of my improved cotton-cultivating machine, parts being broken away and the levers by which the adjustable frame is controlled being shown in section. Fig. 2 is a side view of the machine, the right-hand wheel being removed. Fig. 3 is a central longitudinal sectional view of the machine, the view being taken on line $x$ $x$ of Fig. 1. Fig. 4 is a front view of the machine, the pole being shown in section. Fig. 5 is a cross-sectional view of a portion of the machine, the view being taken on line $y$ $y$ of Fig. 2. Fig. 6 is a rear view of the machine. Fig. 7 is a detail view in partial section and upon an enlarged scale, the view being given to illustrate the means employed for adjustably mounting the covering-shovels. Fig. 8 is a detail view of one of the ratchet-washers employed in the mounting of the covering-shovels. Fig. 9 is a detail view of one of the blades of the chopper-wheel, and Fig. 10 is a detail view of another of the chopper-wheel blades.

In the drawings, 10 represents the main supporting-frame, which may be made in any proper manner. The axle 11 is rigidly connected to vertical standards 12, which extend upward from the horizontal timbers $a$ of the frame 10. To about the center of the axle there is secured a block 13, which serves as a foot-board and as a support for an upwardly-extending standard 14, upon which the seat 15 is mounted. Near the forward end of the frame 10 there are arranged two vertical frames 16 and 17, the frame 16 serving as a support for the tongue 18, while to the frame 17 there is journaled a shaft 19, which carries two sheaves 20, and a crank-arm 21. The frames 16 and 17 may be connected by braces, as 22, any proper framing answering in this connection.

The main frame 10 is formed with a rearwardly-extending frame 23, which supports vertical standards 24, that are braced by side rods or bars 25, extending from the frame 17 through the standards 12, as shown, and these vertical standards 24 carry bearings for a horizontal shaft 26, which carries sheaves 27 and a crank-arm $21^a$. To the sheaves 20 and 27, I connect ropes or chains 28, which extend downward to a supplemental frame 30, which carries a transverse horizontal shaft 31, upon which I mount driving-wheels 32, said wheels being made up of hubs which carry radially-extending blades $d$. Upon the shaft 31 there is mounted a gear 34, that engages a pinion 35, carried by a longitudinal shaft 36, which is journaled in proper bearings carried by the frame 30, and upon this shaft 36, I mount a chopper-wheel 37, the construction of which will be hereinafter described.

To the forward end of the frame 30, I connect two scraper-shovels 40, while to the rear end of the frame I adjustably connect cultivator-shovels 41, which said cultivator-shovels are supported by standards 42, the shovels being formed with sockets 43, that are entered by the standards and the parts being held to place by set-screws 44. The standards 42 are rigidly connected to studs 45, that extend upward through apertures formed in the frame 30, a plate $e$, formed with ratchet-teeth, being secured about the apertures, as shown in Fig. 7. The upper portion of the stud 45 is squared, and upon the squared section, which is shown at $f$, I fit a ratchet-washer 46, the general arrangement of which is best shown in Fig. 8. The extreme upper end of the stud 45 is threaded to engage a clamping-nut 47.

From the construction above described it will be seen that by loosening the nut 47 and slightly raising the washer 46 the stud may be adjusted to such position as may be desired, while a vertical adjustment of the shovel 41 is secured by loosening the set-screw 44, or an adjustment of the angle of the shovel may be secured in this latter manner, the shovel being moved bodily toward or from the row when the standard is adjusted as first described.

In order that the frame 30 and the parts carried thereby may be raised from the ground at times when the machine is being moved from place to place or when it is being turned at the end of a row, I connect rods 50 and 50$^a$ to the crank-arms 21 and 21$^a$, and these rods 50 and 50$^a$, I connect to levers 51 and 51$^a$, said levers being pivotally connected to the standards 12 and arranged so that they will engage toothed racks 52 and 52$^a$. From this construction it will be seen that if the lever 51$^a$ be thrown forward the rear end of the frame 30 will be raised, and that if the lever 51 be thrown forward the forward end of the frame 30 will be raised.

It is almost impossible to draw a machine of this character ahead in a straight line, as the machine-body will necessarily sway slightly from side to side; but it is necessary that the scraping-shovels 40 should operate upon each side of the row that is being cultivated, and to secure this required operation of the scraping-shovels 40, I have provided a lever 54, which is connected to a projection 55, that extends upward from the forward end of the frame 30, said lever extending to within reach of the driver through a vertical slot $h$, formed in a downwardly-extending projection 56, that is carried by the frame 17, the arrangement being such that by moving the lever-handle to the right the forward end of the frame 30 will be carried to the left, and vice versa. To steady the rear end of the frame 30, I provide said frame with an upwardly-extending projection 58, which rides in a slot formed in a block 59, that is carried by the rearwardly-extending section 23 of the frame 10.

In practice I prefer that the gear 34 should have about four times as many teeth as the pinion 35, by which arrangement I secure four revolutions of the shaft 36 for every revolution of the wheels 32, and, although the blades of the wheel 37 might be arranged in any manner, so that as the wheel revolved said wheel would leave a space in the row that the blades would not operate on, I prefer to provide said wheel with seven hoes or blades and to leave one space blank, six of the hoes being provided with three-inch cutting-edges and the seventh with a two-inch cutting-surface, all of the blades being curved forward, as shown, the arrangement being such that as the wheel revolves the cuts made by the six broad blades (which are of the form shown at $n$ in Fig. 9) will overlap one inch, while the cut formed by the narrower blade $m$ (shown in Fig. 10) will not overlap, this result being brought about when the propelling-wheels are sixty-four inches in circumference, so that as said wheels advance one-quarter of a revolution, which is sixteen inches, the cotton will be chopped away fourteen inches, and a space two inches wide will be left.

In certain instances the relative rotation of the shafts 31 and 36 might be changed by changing the number of teeth in the pinion 35, and to this end I would adjustably connect the gear 34 to the shaft 31, the gear being held to place upon the shaft by a set-screw $i$.

The animals by which the implement is drawn forward are connected to hooks or clevises 70, that are connected to the forward end of the frame 10.

From the construction above described it will be seen that the depth of cut of the scrapers 40 may be regulated by adjusting the lever 51, while the depth of cut of the cultivator-shovels 41 may be adjusted through the medium of the lever 51$^a$, and that when the implement has finished its work upon the row the frame 30 may be raised, so that the parts carried thereby will be freed from the ground by throwing both levers 51 and 51$^a$ forward.

By means of the implement hereinbefore described I am able to scrape, chop, and cultivate a row of cotton by passing over said row once, while heretofore a similar result has been obtained only by going over the ground three times, so that the saving of time and labor resulting from the use of my improved implement is very considerable.

Although I have described a specific form of chopper-wheel, I desire it to be distinctly understood that the chopping-blades might be increased in width and diminished in number, or decreased in width and increased in number, without departing from the spirit of my invention.

Having thus described my invention, I claim as new and desire to secure by Letters Patent—

1. In a cotton-cultivating machine, the combination, with a main supporting-frame, of a frame adjustably connected thereto, a chopper-wheel carried by the adjustably-mounted frame, driving-wheels, also carried by the adjustably-mounted frame, and connections between said driving-wheels and the chopper-wheel, substantially as described.

2. In a cotton-cultivating machine, the combination, with a main supplemental frame 10, of a frame 30, adjustably connected to the frame 10, a chopper-wheel 37, which is supported by the frame 30, driving-wheels 32 upon the supplemental frame, a gear 34, controlled by said driving-wheels, and a pinion 35, that is engaged by the gear and carried by the chopper-wheel shaft, substantially as described.

3. In a cotton-cultivating machine, the combination, with a main supporting-frame, of shafts 19 and 26, carried thereby, pulleys 20 and 27, supported by the shafts, chains or ropes 28, connected to the pulleys, a frame 30, connected to the chains or ropes 28, a shaft 36, carried by the frame 30, a chopper-wheel 37, mounted upon the shaft, a driving-shaft 31, driving-wheels carried thereby, a gear carried by the shaft 31, a pinion 35, carried by the shaft 36 and engaged by the gear 34, and a mechanism, substantially as described, for turning the shafts 19 and 26.

4. In a cotton-cultivating machine, the combination, with a main supporting-frame, of a frame 30, connected thereto, scraper-shovels carried by the frame 30, a chopper-wheel and the chopper-wheel-driving attachment, also carried by the frame 30, and cultivating-shovels, substantially as described.

5. In a cotton-cultivating machine, the combination, with a supporting-frame, of a frame 30, suspended therefrom, scraper-shovels carried by the frame 30, a chopper-wheel and means for driving it, also carried by the frame 30, cultivator-shovels adjustably connected to the frame 30, a means for raising the frame 30, and a lever 54, connected to the forward end of the frame 30 and fulcrumed in the main supporting-frame, substantially as described.

EDWIN ELIJAH RUNYON.

Witnesses:
 URIAH A. MAGEE,
 WILLIAM S. PRICE.